United States Patent
Zhu et al.

(10) Patent No.: US 9,361,920 B1
(45) Date of Patent: Jun. 7, 2016

(54) COMPENSATION FOR TRACK MISALIGNMENT DUE TO DEGRADATION OF HAMR WRITE HEAD

(71) Applicant: Seagate Technology LLC, Cupertino, CA (US)

(72) Inventors: Wenzhong Zhu, Apple Valley, MN (US); Franklin P. Martens, Bloomington, MN (US); Alfredo Sam Chu, Prior Lake, MN (US); Kaizhong Gao, North Oaks, MN (US); Edward Charles Gage, Lakeville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/626,157

(22) Filed: Feb. 19, 2015

(51) Int. Cl.
  *G11B 11/00* (2006.01)
  *G11B 5/56* (2006.01)
  *G11B 5/00* (2006.01)
  *G11B 7/00* (2006.01)
  *G11B 5/31* (2006.01)

(52) U.S. Cl.
  CPC . *G11B 5/56* (2013.01); *G11B 5/314* (2013.01); *G11B 7/00* (2013.01); *G11B 2005/0021* (2013.01); *G11B 2220/2525* (2013.01)

(58) Field of Classification Search
  None
  See application file for complete search history.

(56) References Cited

U.S. PATENT DOCUMENTS

| | | | | |
|---|---|---|---|---|
| 6,008,962 | A * | 12/1999 | Le et al. | 360/77.08 |
| 6,078,454 | A * | 6/2000 | Takahashi et al. | 360/66 |
| 6,181,673 | B1 | 1/2001 | Wilde et al. | |
| 8,149,652 | B2 | 4/2012 | Erden et al. | |
| 8,760,793 | B1 * | 6/2014 | Wu | 360/77.01 |
| 2003/0026017 | A1 * | 2/2003 | Chong et al. | 360/31 |
| 2004/0080859 | A1 * | 4/2004 | Teo et al. | 360/77.02 |
| 2005/0128632 | A1 * | 6/2005 | Nakamura et al. | 360/75 |
| 2007/0291402 | A1 * | 12/2007 | Eleftheriou et al. | 360/77.07 |
| 2011/0069414 | A1 * | 3/2011 | Urakami et al. | 360/264 |
| 2013/0003214 | A1 * | 1/2013 | Grundvig et al. | 360/51 |
| 2014/0192435 | A1 * | 7/2014 | Buch | 360/48 |
| 2014/0268394 | A1 * | 9/2014 | Emo et al. | 360/48 |

* cited by examiner

*Primary Examiner* — Tan X Dinh
(74) *Attorney, Agent, or Firm* — Hollingsworth Davis, LLC

(57) ABSTRACT

An offset from track center of data is determined in a data storage device. The data is written to a heat-assisted magnetic recording medium of the device, and the offset compensates for degradation of an optical component of a read/write head when writing the data. The offset is stored in a memory of the storage device. Using the offset, a track alignment is changed during subsequent writes via the read/write head.

20 Claims, 7 Drawing Sheets

COMPENSATION FOR TRACK MISALIGNMENT DUE TO DEGRADATION OF HAMR WRITE HEAD

SUMMARY

The present disclosure is directed to compensation for track misalignment due to degradation of a heat-assisted magnetic recording write head. In one embodiment, an offset from track center of data is determined. The data is written to a heat-assisted magnetic recording medium of a data storage device, and the offset compensates for degradation of an optical component of a read/write head when writing the data. The offset is stored in a memory of the storage device. Using the offset, a track alignment is changed during subsequent writes via the read/write head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
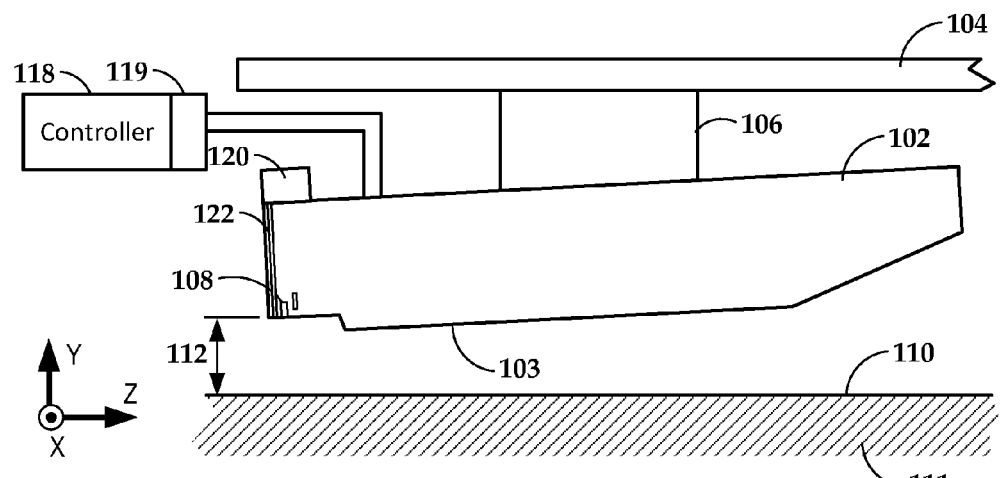
FIG. 1 is a block diagram of a hard drive slider and media arrangement according to an example embodiment.

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head). The NFT may also be referred to as a plasmonic transducer, plasmonic antenna, near-field antenna, nano-disk, nano-patch, nano-rod, etc.

Generally, the NFT is formed by depositing a thin-film of material such as gold, silver, copper, etc., that achieves surface plasmon resonance when exposed to laser light that is delivered to the NFT via an integrated optics waveguide or some other delivery system. The light generates a surface plasmon field on the NFT, and the NFT is shaped such that the surface plasmons are directed out of a surface of the write head onto a magnetic recording medium.

Due to the intensity of the laser light and the small size of the NFT, the NFT and immediately surrounding material are subject to a significant rise in temperature during writing. Over time, this can affect integrity of the NFT, e.g., causing it to become misshapen. Other events, such as contact between the read/write head and recording medium, contamination, etc., may also affect the operation of the NFT and nearby optical components. While there are ways to mitigate these issues, it will be a continuing challenge to reduce failures due to optical component degradation in HAMR storage devices.

One effect that has been seen as the NFT and other optical components age is that the tracks may be written off-center from where the read/write head is positioned. For example, if the NFT shape becomes deformed, the plasmons may be misdirected in a cross-track direction. This can cause problems when trying to read back the data. The read transducer will attempt to read data aligned with the center of the track as defined by servo marks on the recording medium, however the region with the strongest magnetic flux changes will be off-center. As described in detail below, a number of measures can be incorporated to deal with data written off-track-center due to NFT wear.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred to as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the read/write head 102 and other components.

The illustrated read/write head 102 is configured as a HAMR device, which includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
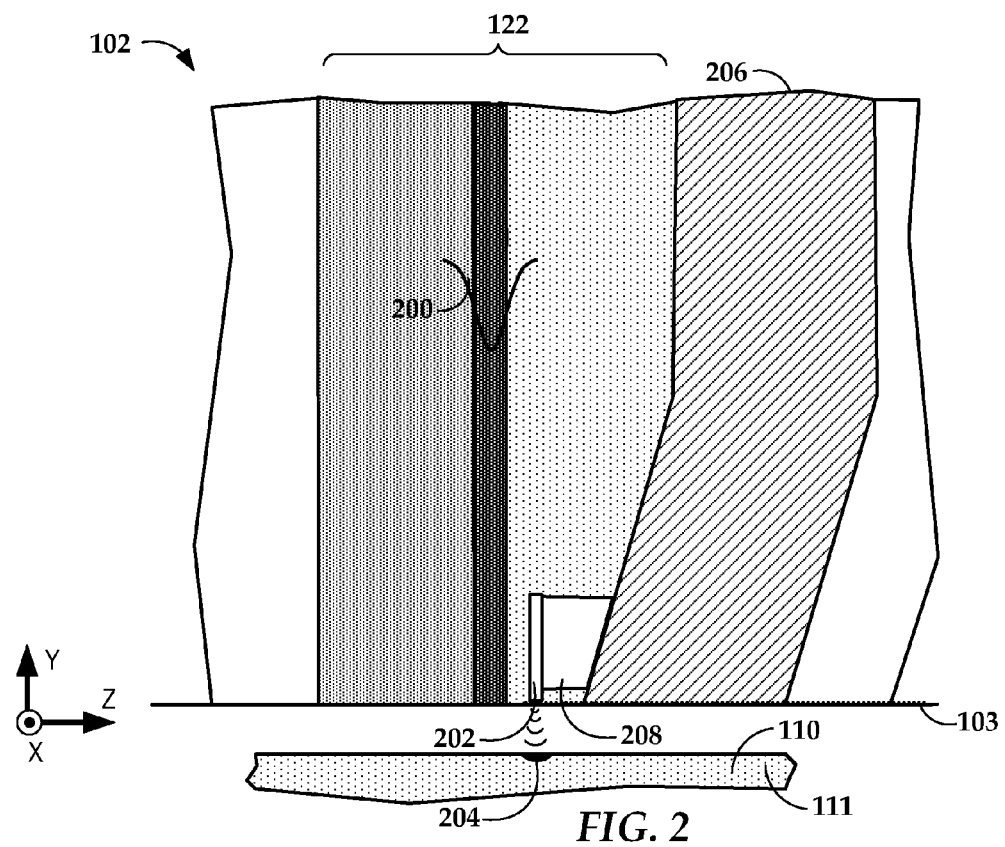
FIG. 2 is a cross-sectional view of a read/write head according to an example embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be quite significant, leading to degradation of the near-field transducer 202 over time.

As noted above, one effect observed as a result of NFT degradation is that tracks may be written off-center from where they are expected to be. This can cause errors and/or data loss if not corrected. It will be understood that in the following description testing and mitigation may described as compensating for NFT degradation. However, it will be understood the procedures may compensate for degradation of any optical component of a read/write head that may cause misplacement of the hotspot. Degradation of components such as waveguides, couplers, mirrors, dielectric surrounding materials, etc., may also affect the location of the hotspot, and can be corrected similarly to NFT degradation.

Figure 3:
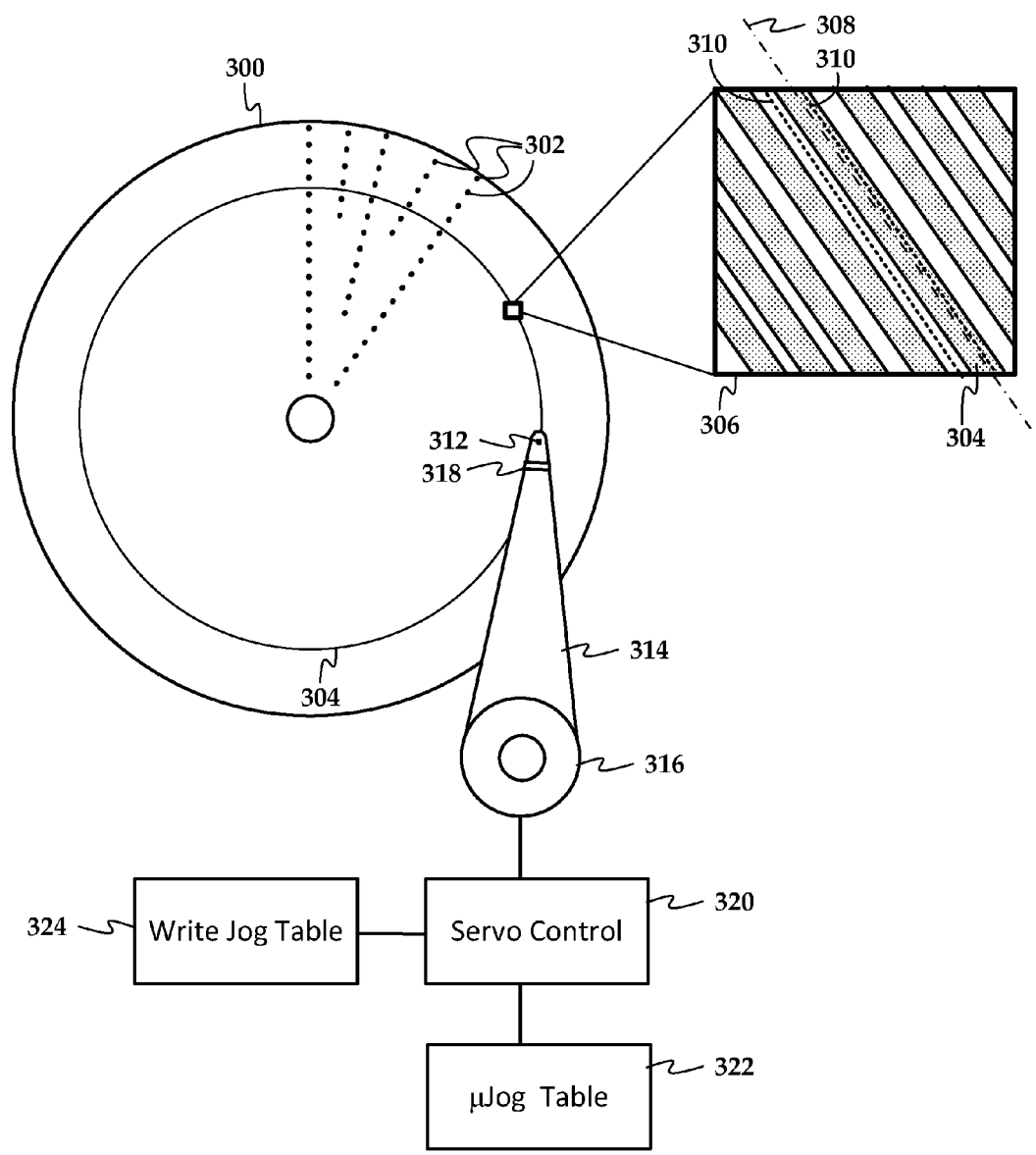
FIG. 3 is a block diagram of a recording medium and read/write components according to an example embodiment.

In reference now to FIG. 3, a block diagram illustrates tracks being recorded off-center on a HAMR recording medium 300. Generally, the recording medium includes prewritten servo marks 302 (also referred to as servo wedges, servo sectors, etc.) that facilitate locating where the read/write head is relative to the recording medium. The servo marks 302 contain reference data that allows locating a radial position (e.g., corresponding to different tracks) and angular position (e.g., corresponding to different sectors within a track).

Data is written to the recording medium 300 in a series of concentric tracks, as represented by track 304. Each track is divided into data sectors interspersed between the servo marks. Close up view 306 shows representative adjacent tracks (shaded), which may be separated from one another by guard bands (unshaded). In some arrangements such as shingled recording, some tracks may be overlaid such that there is no explicit guard band. Generally, each track will have a centerline, as indicated by centerline 308 for track 304, which is a virtual reference curve over which the servo system attempts to position the read and write transducers for respective read and write operations. Even if the magnetic write transducer (e.g., write pole) is perfectly aligned with the centerline, NFT degradation may cause the plasmon stream that creates the hotspot to be incorrectly aimed. This results in data to be recorded off center as indicated by dashed lines 310.

The off-center writing of tracks may cause a number of issues. For example, the signal strength detected by the read transducer will be lower if it is located off-center from where the track was originally written, resulting in lower signal to noise ratio (SNR). In some cases, adjacent tracks that were previously written before the misalignment occurred may be subject to higher than normal levels of cross-track interference. Depending on the severity of the offset and the proximity of the adjacent tracks, some amount of adjacent track erasure may occur.

In one embodiment, changes are made to a servo control system to alleviate track offset due to NFT wear or degradation of some other optical component. As shown in FIG. 3, a read/write head 312 is shown attached to an arm 314. A voice coil motor 316 rotates the arm 314 to position the read/write head over tracks of the recording medium 300. A microactuator 318 may also be used to finely position the read/write head. A servo controller 320 receives signals from the read/write head 312 as it passes the servo marks 302. Based on the servo signals, the servo controller 320 outputs signals to the voice coil motor 316 and microactuator 318.

The servo controller 320 may utilize a micro jog table 322, also sometimes referred to as a "jog table." The micro jog table 322 provides information that allows the servo controller 320 to correct for effects of skew on the relative alignment between read and write heads over tracks. Because the read transducer and write transducer are offset to one another in a downtrack direction, their relative alignment over tracks changes as a function of radial distance from center, which in turn affects skew angle. The servo controller 320 uses data from the micro jog table 322 as input to a servo control loop when positioning the read/write head 312 over the recording medium 300 to correctly align the read transducer over the written tracks. Generally, the micro jog table 322 is recorded during manufacture of the hard disk drive assembly. During factory testing, the reader-to-writer offset is measured at the inner diameter, outer diameter, and locations in between. The results are used to fit to a curve, e.g., fourth-order polynomial, and the coefficients of the fit are saved to the micro jog table 322. During a read operation, these coefficients are used to determine a current offset for the reader as a function of radial distance from a center of the disk.

In one embodiment a procedure such as a Head Health Self Assessment Test (H2SAT) can be used to repeatedly monitor the track center. The H2SAT can be run in factory process or foreground/background in the field. As will be described below, one procedure that can be run in the H2SAT is to read data one or more tracks at various locations on either side of the track center. Analysis of the data relative to track location (or stroke) can indicate that the tracks are shifted and by how much. If it is detected that a recorded track is center shifted, the amount of shift may be characterized by performing curve fit for the measured data across the stroke, e.g., over different regions from the inner diameter to outer diameter of the disk. The polynomial coefficients of the curve fit can be saved to write jog table 324. During subsequent write operations, the write jog table is accessed, and the seek goes to an off center position based on write jog table 324 to compensate the write center shift. In response to this shift, the track is written along the servo-defined center on the medium 300. This overcomes the write encroachment and off center read problems noted above.

Figure 4:
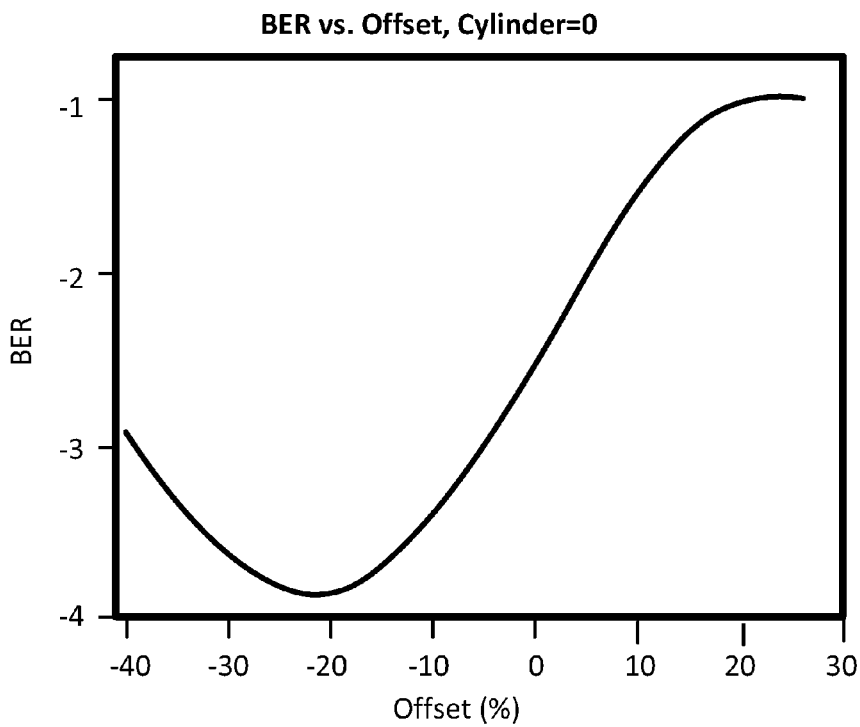
FIGS. 4, 5, and 6 are graphs illustrating track misalignment due to degradation in an apparatus according to an example embodiment.

In FIG. 4, a graph illustrates test results showing off track writing due to NFT degradation according to one embodiment. A HAMR disk drive was subjected to an endurance test, during which it experienced failures when reading back recently written test data. Generally, reading of a track of data resulted in a number of retries until a time out error occurred, and the track was declared failed (unreadable). The graph in FIG. 4 shows the resulting BER when attempting to read the failed track using deliberate offsets from track center. As indicated by the lowest point in the curve, the write center was shifted by about −20%, and the BER at this offset is low enough that the track could be read or recovered if the reader was shifted by this amount.

Figure 5:
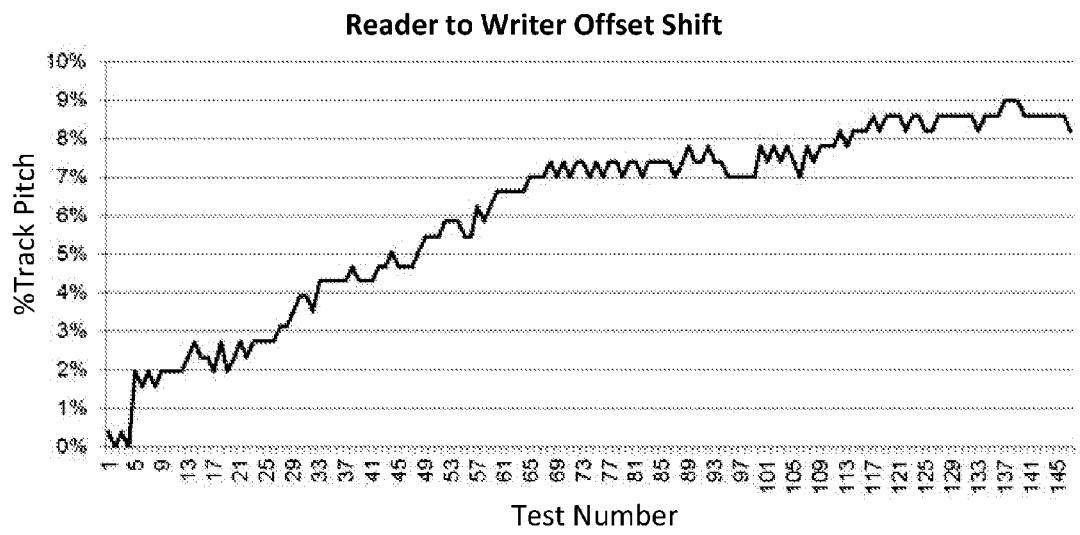

In FIG. 5, a graph shows the steady progression of this writer-to-reader offset at it progresses over time in a HAMR storage device according to an example embodiment. Between testing runs (e.g., writing and reading of test data) a crosstrack scan similar to the one shown in FIG. 4 was performed. It can be seen that at the end of the run, the track was written about 8.5% off-center.

Figure 6:
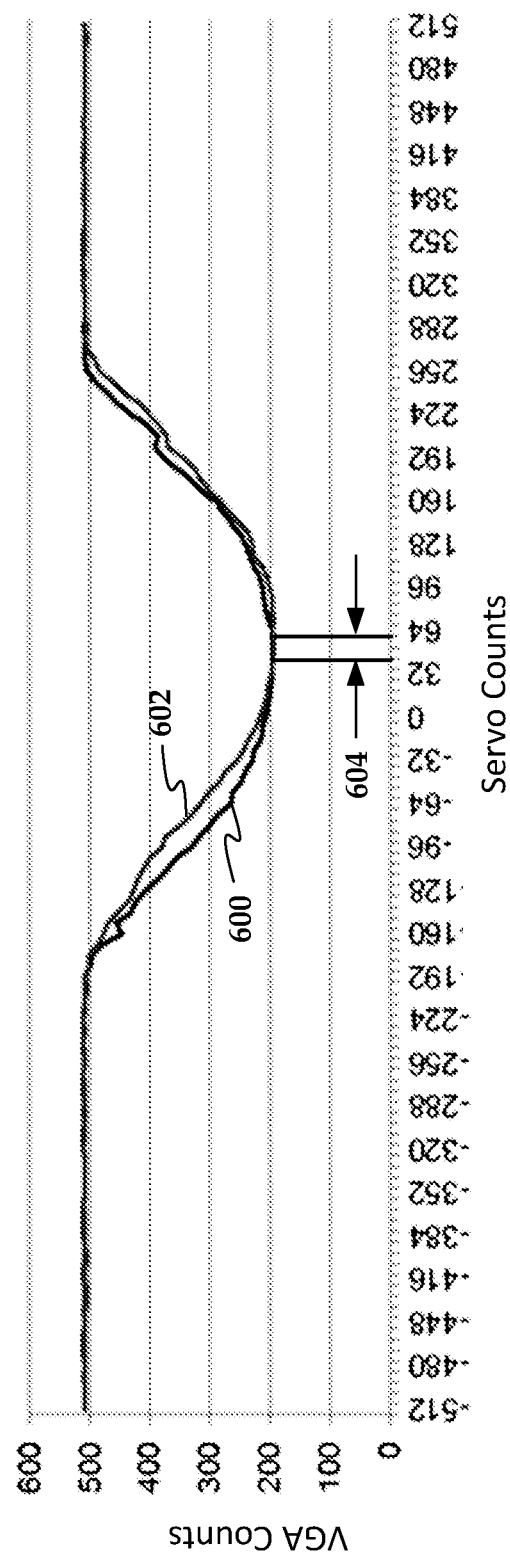

In FIG. 6, a graph shows additional measurements made before and after the test from which the data of FIG. 5 was taken. The vertical axis represents inputs to a variable gain amplifier (VGA) used to obtain a desired read amplitude. The VGA input is inversely related to signal strength from the read transducer, e.g., low VGA corresponds to high signal strength. The horizontal axis represents a digital input to a servo actuator that positions the read write head in a cross-track direction. Curve 600 represents measurements of a representative track taken before the test and curve 602 represents measurements of an equivalent track taken after the test. The "bucket" shape of the curves 600, 602 is indicative of the width of the track, the center of the track being at the lowest VGA input. As indicated by offset 604, there is a shift of about 16 servo counts, which represents a 6% to 8% shift relative to track pitch.

In reference again to FIG. 5, while the graph suggests that the written track center will shift in one direction over time, it will be understood that the mitigation described herein will compensate for the shifts no matter which direction the track center shifts over time. For example, if the curve in FIG. 5 were in the future to slope downward and cross the 0% axis, indicating a shift in the opposite direction, this shift will be detected and mitigated appropriately by the embodiments described herein.

Figure 10:
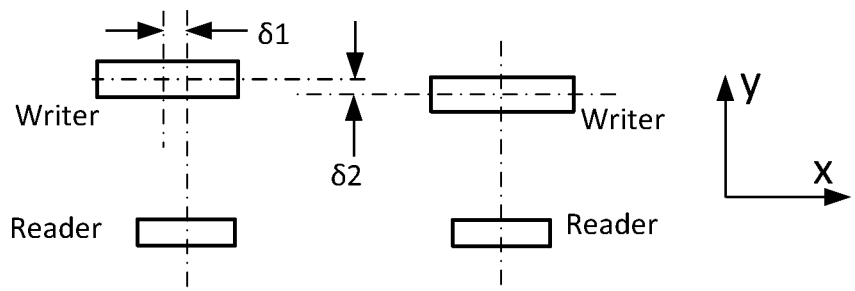
FIG. 10 is a diagram illustrating offsets between reader and writer due to optical degradation of a data storage device according to an example embodiment.

While the above embodiments describe using a write jog table to compensate for cross-track offset of written tracks due to optical degradation, it will be understood that the actual shifting of the hotspot that causes this offset may be in one or both a crosstrack and downtrack direction. In reference to FIG. 10, a block diagram illustrates a crosstrack displacement $\delta 1$ (x-direction in this example) and a downtrack displacement $\delta 2$ (y-direction in this example) between reader and writer that may be induced due to optical degradation of a writer transducer. While the displacements $\delta 1$, $\delta 2$ are shown relative to a writer and a reader at shifted locations, this is not meant to imply the actual reader and writer will be physically displaced from one another. However, the displacements due to optical degradation will have a similar effect on reader-to-writer track alignment as if the illustrated reader and writer were physically displaced as shown.

Figure 11:
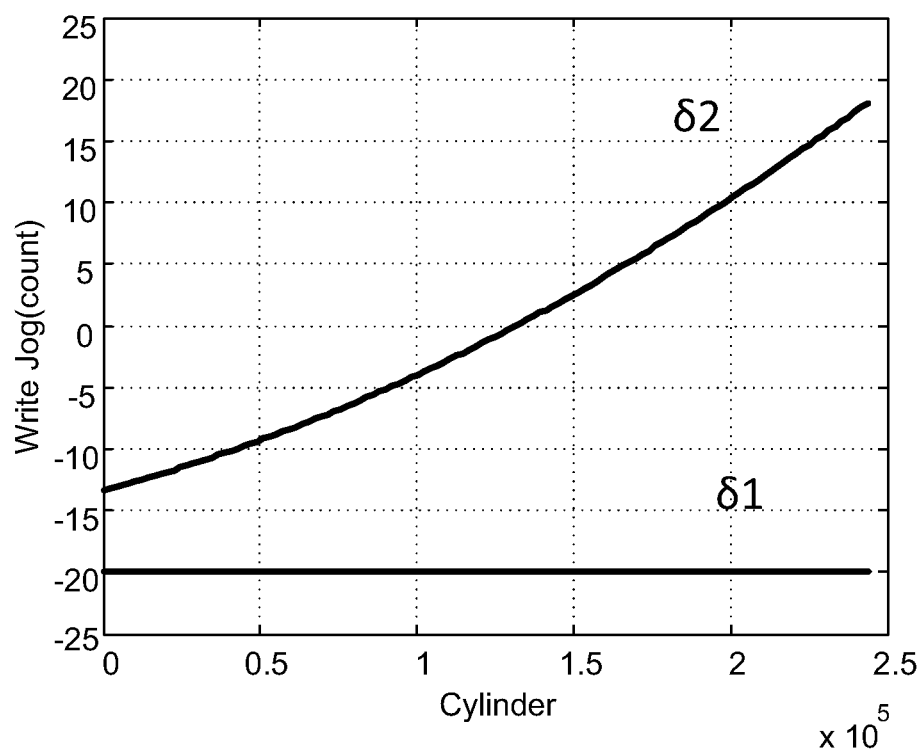
FIG. 11 is a graph illustrating an example curve fit use to compensate to optical degradation of a data storage device according to an example embodiment.

In FIG. 11, a graph illustrates an example curve fits that may be used to compensate for both displacements $\delta 1$, $\delta 2$. The vertical axis represents a servo count offset and the horizontal axis represents a cylinder number (which corresponds to track location as described elsewhere herein). The $\delta 1$ is a pure cross-track shifting of the hotspot, and the compensating offset will be relatively constant across all tracks. The $\delta 2$ shifting of the hotspot is downtrack, and so will have a different compensating offset depending on skew of the read/write head as described above regarding the micro jog table. The $\delta 2$ displacement curve is fit, e.g., as a polynomial function of radial location of the read/write head. Both $\delta 1$, $\delta 2$ are added together to compensate for the optical degradation offset when writing.

Figure 7:
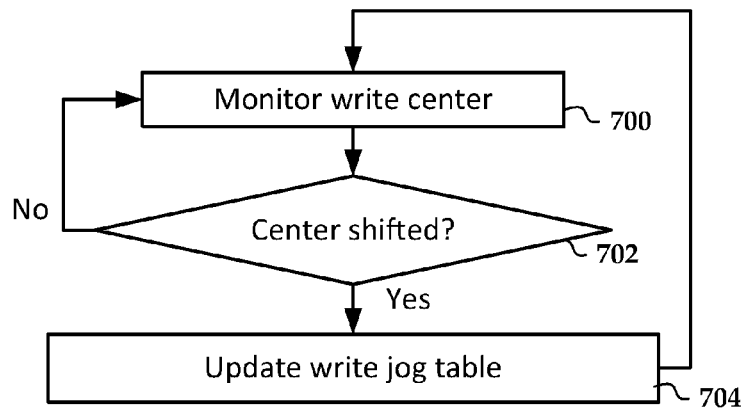
FIGS. 7 and 8 are flowcharts illustrating procedures according to example embodiments.

In FIG. 7, a flowchart illustrates a procedure according to an example embodiment to correct for the above-described center shift during write of a HAMR storage device. The procedure involves monitoring 700 the track center as it is currently being written and detect 702 that a shift in the center has occurred. This may involve scanning a selection of tracks for each head on a pre-defined interval (e.g., once every 24 hours). The tracks that are scanned during the monitoring 700 may be dedicated test tracks embedded in user zone under each head. This allows the procedure to accurately monitor head behavior in various user zones without affecting user data. In the alternate or in addition, the tracks that are scanned during the monitoring 700 may be user data tracks, e.g., corresponding to the most recently written data. This may prevent additional wearing of the optical components by not requiring writing of additional test data, although recently written tracks may not be available in every zone of interest in this approach.

The monitoring 700 and detection 702 may involve, for each head, measuring one or both of visible bit error rate (VBER) and raw BER as a function of cross track offset, and saving the results in a log. This data indicates the best BER position for the read head. If the best BER position is not at the track center, the write center has shifted and block 702 returns "yes." The criteria for whether the track has shifted may vary based on the type of device, measurement error, etc. For example, a curve fit may be performed for the best BER across the stroke with a given offset. If the maximum value of offset is larger than a threshold (e.g., 3% of track pitch) with a confidence interval of 95%, then block 702 may return "yes." The curve fit reduces measurement error across the stroke, and should return an offset across the stroke at or near zero if there is no write center shift.

If the determination at block 702 is that the track center has shifted, then a write jog table is updated 704. The write jog table is accessible by the servo controller to compensate for write center shift. At the factory, a test using steps similar to the monitoring 700 and testing 702 may be performed to align the read/write track centers. Due to the write and read separation, the micro jog adjustment is performed first before any read and write operation. In the micro jog test, the track center is defined as the writer position (write jog=0), and then the micro jog value is how much the reader is moved such that reader is on the track/writer center.

After this factory initialization, the write jog table is then initialized to zero. When a center shift is later detected 702 in the periodic health assessment, if the write center shifts, the best BER position (or max amplitude position) changes across the stroke, a curve-fit is performed for the best position across the stroke, and the value after the curve-fit determines how much offset is applied to move the writer to the track center during write operation. This value may be inverted, since it is based on reader. For example, if the curve fit value is 20 servo counts, the writer is adjusted by −20 servo counts to compensate it. The coefficient of the fit is stored 704 to the write jog table. The function used in the curve fit may be a polynomial, logarithmic function, trigonometric function, or other mathematical relation known in the art.

When data is written to the recording medium, a compensation is performed for each write using the coefficients of the write jog table. During write, the servo seeks to the off center position based on the write jog table to compensate the write center shift, such that the track is written at the track center on the media. Since the track is written at the center, if the write width doesn't change, it will not cause encroachment problems, e.g., the current track won't encroach on an adjacent track that was written before write center change. The original micro jog table can still be used by itself to read tracks written before and after the write center change, because the reader center is not expected to change as a result of optical component degradation.

The procedure in FIG. 7 can be implemented in any combination of software, firmware, and hardware. In one embodiment, the procedure can be implemented a firmware process (e.g., heath assessment) that performs periodic tests on read/write heads and keeps track of head health conditions over the lifetime of the drive. In other embodiments, the procedure in FIG. 7 may be implemented as part of manufacturing, e.g., during qualification testing. It will be understood that other factors besides elapsed time may be used to trigger the procedure of FIG. 7 during use of the storage device. For example, the procedure may be run after a certain number of write cycles have occurred, after a notable performance loss (e.g., rise in BER), as a system or user-initiated diagnostic procedure, etc.

If the procedure in FIG. 7 is performed periodically between a pre-defined interval, the interval may be selected based on an expected shifting of the track center due to NFT degradation. For example, a threshold amount of shift (e.g., 2%, 3%, 4%, etc.) may be set as a threshold for the testing 702. A center track shift at or above this threshold will result in the write jog table being updated 704. Through analysis or design qualification testing, it may be predicted that shift of the threshold amount will occur over a certain time period, e.g., 150 days, for a given level of use. The predefined testing interval may be set as some fraction of this time period, e.g., 1/50, to ensure change in the shift is detected as soon as possible without requiring an excessive number of tests. In this example, the procedure could be run at an interval of 150 days/50=3 days.

The write jog table can updated as necessary during a health self-assessment or similarly repeated background process. Because the time scale of the NFT degradation is much larger than the interval of the self-assessment, only cross-track misalignment will be caught at a low threshold which will prevent any encroachment or problems with reading off-center. As previously noted, the alignment test and correction procedure can run at the factory and/or can run as a foreground process in the deployed storage device, e.g., when a head reaches a certain write cycle threshold, instead of as a background process at pre-defined time intervals (background run). The test can run on each head alone, instead of all heads together.

Figure 8:
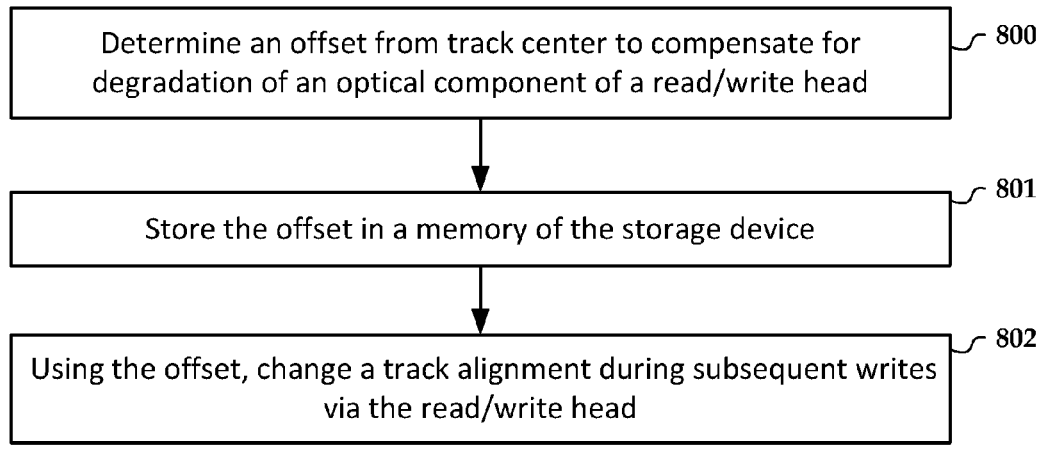

In FIG. 8, a flowchart illustrates a method according to an example embodiment. The method involve determining 800 an offset from track center of data written to a heat-assisted magnetic recording medium of a data storage device. The offset compensates for degradation of an optical component of a read/write head when writing the data. Determining 800 the offset may involve writing test data to a dedicated test track and measuring bit error rate of the test data versus cross-track position. The offset is stored 801 in a memory of the storage device. Using the offset, a track alignment is changed 802 during subsequent writes via the read/write head.

Figure 9:
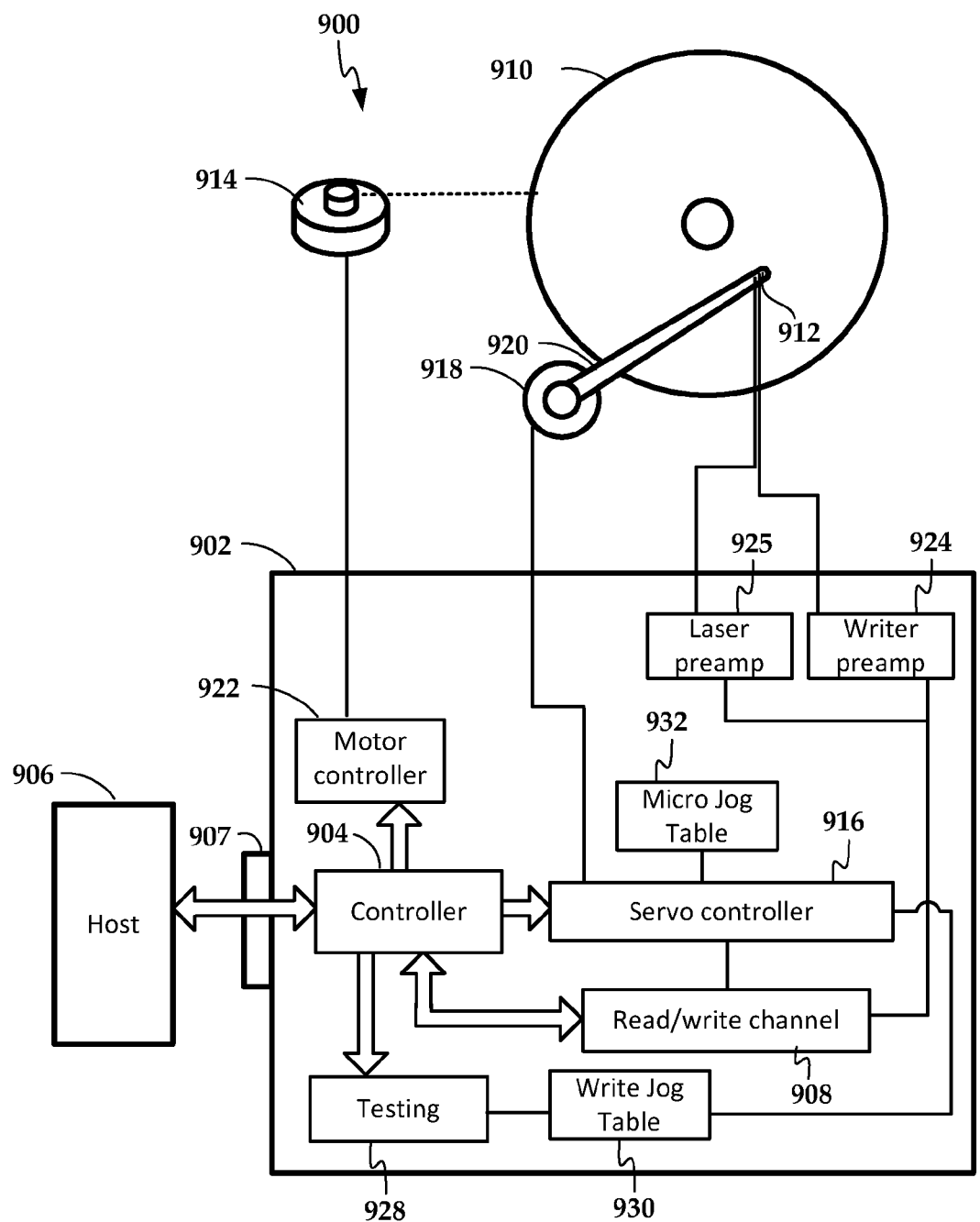
FIG. 9 is a block diagram of a system and apparatus according to an example embodiment.

In reference now to FIG. 9, a block diagram illustrates components of a hard drive apparatus 900 according to an example embodiment. The apparatus 900 includes circuitry 902 that is coupled to electromechanical components and electromagnetic sensors and transducers. The circuitry 902 includes a controller 904 that controls a number of functions of the apparatus 900, including communications between the apparatus 900 and a host device 906 via a host interface 907. The controller 904 may include any combination of custom logic circuits, application specific integrated circuits (ASICs), general-purpose central processing unit (CPU), interface circuits, and may utilize instructions stored as firmware and/or software.

The host device 906 may include any electronic device that can be communicatively coupled to store and retrieve data from an HDD, e.g., a general-purpose computer, a factory test bench, etc. The controller 904 may carry out write commands by formatting the data into sectors and transferring the formatted data via a read/write channel 908 to the data storage surface of a disk 910. The controller 904 may provide analogous functions for read commands, e.g., determining the location of the desired data, moving the heads to the location (track) of the data, reading the data from the disk 910 via the read/write channel 908, correcting any errors and formatting the data for the host 906, etc.

The read/write channel 908 converts data between the digital signals processed by the data controller 904 and the analog signals conducted through read/write heads 912. The read/write channel 908 also provides servo data read from the disk 910 to a servo controller 916. The servo controller 916 uses these signals to drive an actuator 918 (e.g., voice coil motor) that rotates an arm 920, upon which the read/write heads 912 are mounted. The heads 912 are moved radially across different tracks of the disk(s) 910 by the actuator motor 918 (e.g., voice coil motor), while a spindle motor 914 rotates the disk(s) 910. A microactuator (not shown) may also be included to provide finer tracking control, and also receives inputs from the servo controller 916. The data controller 904 controls the spindle motor 914 by way of a motor controller 922.

The read/write channel 908 provides analog write signals that are delivered to the write head 912 by way of a write preamp 924. The write preamp 924 amplifies and conditions the write signals so that magnetic fields generated at the write head 912 are of a duration and magnitude that results in efficient storage of data on the magnetic surfaces of the disk 910. For example, the preamp 924 may condition the write signal to account for load characteristics (e.g., resistance, capacitance, inductance) of the signal path that couples the write head 912 to the preamp 924, and for characteristics of the write head 912 itself.

In the illustrated embodiment, a laser preamplifier 925 energizes a laser (or other energy source) at the write head 912 during write operations. The laser preamplifier 925 conditions the signals to ensure the laser provides sufficient energy to heat a spot on the disk 910 as it is being recorded. The laser preamplifier 925 may responds to signals from the read/write channel 908 (or servo controller 916) that indicate when to activate and deactivate the laser, as well as setting the amount of laser power to apply.

A testing module 928 is operable by the controller to perform operations as described previously herein. Generally, the testing module 928 may operate during a design, manufacturing, and/or operational phase of the apparatus 900 to measure a cross-track alignment of tracks written to the disk 910. This testing may determine a direction and magnitude of this offset, and store a representation of this value in a write jog table 930, which is stored in a non-volatile memory (e.g., flash memory, static random-access memory, disk 910). For example, the offset may be defined as a positive or negative integer that represents an adjustment to a digital-to-analog converter (DAC) that drives the actuator 918 and/or microactuator. It will be understood that the offset may be stored in the write jog table 930 in various formats. In one example, the actual offset amount may be stored, in which case the jog correction will be the inverse of the offset. In another example, the amount of jog needed to overcome the offset may instead be stored. Because the actual value of the offset may vary across different tracks, zones, or other defined regions, the offset may be stored as a range or function, e.g., store as coefficients of a function that estimates the region-dependent offset using the current track, zone, region, etc. as a variable.

During write operations, the servo controller 916 accesses the write jog table 930 and determines offset for the currently written track and applies the offset when tracking via the actuator 918 and microactuator. A micro jog table 932 may also be stored in the non-volatile memory. The micro jog table 932 includes parameters to compensate for reader-to-write offsets as a function of skew. When reading data, only the micro jog table 932 is accessed by the servo controller 916.

While the servo offset data is described as being stored in tables 930, 932, it will be understood that this data may be arranged within a non-volatile memory in any format, e.g., table, array, tree, hash set, relational database, etc. Further, while the testing module 928 is shown as internal to the hard drive apparatus 900, the functions of the module 928 may be stored and/or executed externally, e.g., via the host 906. For example, the host 906 may be configured as a testing apparatus and may direct the controller to perform the above-described functions as part of a qualification test.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
repeatedly determining an offset from track center of data written to a heat-assisted magnetic recording medium of a data storage device via a read/write head of the data storage device, the offset compensating for degradation of an optical component of the read/write head when writing the data, the degradation not affecting a reader of the read/write head;
storing each repeatedly determined offset in a micro-jog table that includes parameters to compensate for the effects of skew, a non-volatile memory of the storage device comprising the micro-jog table and a write jog table;
during writing, determining a track-specific or zone-specific offset from the write jog table to change a track alignment during subsequent writes via the read/write head using the track-specific or zone-specific offset; and
during reading, adjusting a read track alignment based on the micro-jog table and not the write jog table.

2. The method of claim 1, wherein determining the offset comprises measuring bit error rates of the data versus cross-track position.

3. The method of claim 1, wherein determining the offset comprises measuring amplitudes of the data versus cross-track position.

4. The method of claim 1, wherein the determining of the offset and the storing of the offset are performed repeatedly as part of a background process.

5. The method of claim 4, wherein the background process is repeated at regular intervals, and a wherein a time between the intervals is less than a time scale of the degradation of the optical component.

6. The method of claim 1, wherein the degradation of the optical component results in at least one of a downtrack and crosstrack shifting of a hotspot applied to the recording medium when writing the data.

7. The method of claim 1, wherein the offset is stored as a coefficients of a function, and wherein using the offset during the subsequent writes comprises determining a track-specific offset based on the function.

8. The method of claim 1; wherein determining the offset is performed on a dedicated test track.

9. An apparatus, comprising:
a controller configured to read from and write to a heat-assisted magnetic recording medium via a read/write head, the controller configured to:
repeatedly determine an offset from track center of data written to the recording medium via the read/write head, the offset compensating for degradation of an optical component of the read/write head when writing the data, the degradation not affecting a reader of the read/write head;
store each repeatedly determined offset in a micro-log table that includes parameters to compensate for the effects of skew, a non-volatile memory of the apparatus comprising the micro-jog table and a write jog table;
during writing, determine a track-specific or zone-specific offset from the write jog table to change a track alignment during subsequent writes via the read/write head using the track-specific or zone-specific offset; and
during reading adjust a read track alignment based on the micro-jog table and not the write jog table.

10. The apparatus of claim 9, wherein determining the offset comprises measuring bit error rates of the data versus cross-track position.

11. The apparatus of claim 9, wherein determining the Offset comprises measuring amplitudes of the data versus cross-track position.

12. The apparatus of claim 9, wherein the determining of the offset and the storing of the offset are performed repeatedly as part of a background process.

13. The apparatus of claim 12, wherein the background process is repeated at regular intervals, and a wherein a time between the intervals is less than a time scale of the degradation of the optical component.

14. The apparatus of claim 9, wherein the degradation of the optical component results in at least one of a downtrack and crosstrack shifting of a hotspot applied to the recording medium when writing the data.

15. The apparatus of claim 9, wherein the offset is stored as a coefficients of a function, and wherein using the offset during the subsequent writes comprises determining a track-specific offset based on the function.

16. An apparatus, comprising:
- a non-volatile memory comprising a write jog table and a micro-jog table that includes parameters to compensate for the effects of skew;
- interface circuitry coupled to a read/write head configured to read from and write to a heat-assisted magnetic recording medium; and
- a controller coupled to the non-volatile memory and the interface circuitry and configured to:
    - repeatedly determine an offset from track center of data written to the recording medium via the read/write head, the offset compensating for degradation of an optical component of the read/write head when writing the data, the degradation not affecting a reader of the read/write head;
    - store an entry in the write jog table for each repeatedly determined offset;
    - during writing, determining a track-specific or zone-specific offset from the write jog table to change a track alignment during subsequent writes via the read/write head using the track-specific or zone-specific offset; and
    - during reading, adjusting a read track alignment based on the micro-jog table and not the write jog table.

17. The apparatus of claim 16, wherein determining the offset comprises measuring one of hit error rate and amplitude of the data versus cross-track position of the read/write head.

18. The apparatus of claim 16, wherein the entry comprises coefficients of a function determined via a curve fit using the offset.

19. The apparatus of claim 16, wherein the determining of the offset and the storage of the entry are performed repeatedly as part of a background process, a time between the intervals being less than a time scale of the degradation of the optical component.

20. The apparatus of claim 16, wherein the degradation of the optical component results in at least one of a downtrack and crosstrack shifting of a hotspot applied to the recording medium when writing the data.

\* \* \* \* \*